Figure 1:
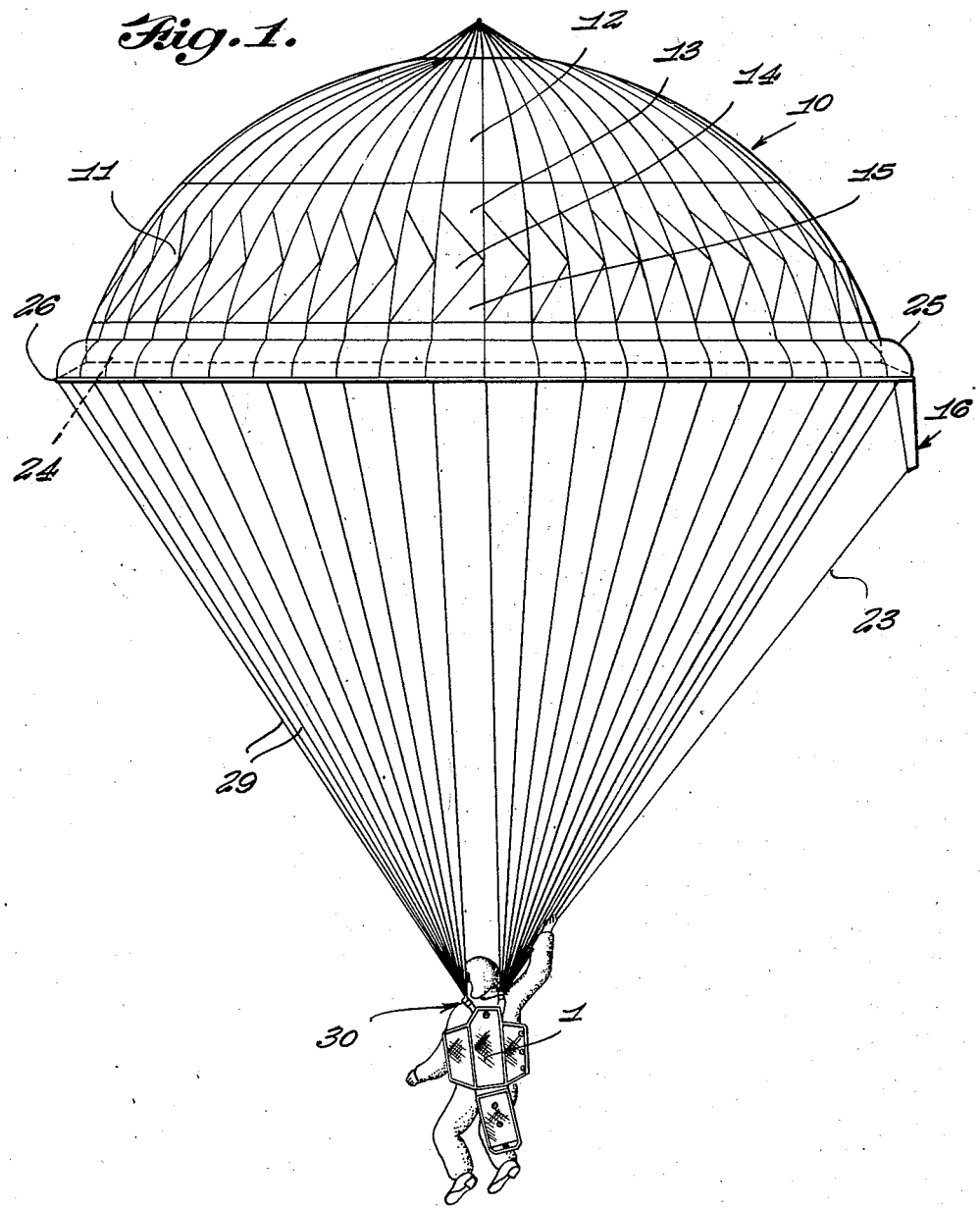

May 11, 1943.  G. G. COLEMAN  2,318,674
PARACHUTE
Filed April 9, 1941  3 Sheets-Sheet 2

Inventor
George G. Coleman
By Lacey & Lacey,
Attorneys

May 11, 1943. G. G. COLEMAN 2,318,674
PARACHUTE
Filed April 9, 1941 3 Sheets-Sheet 3
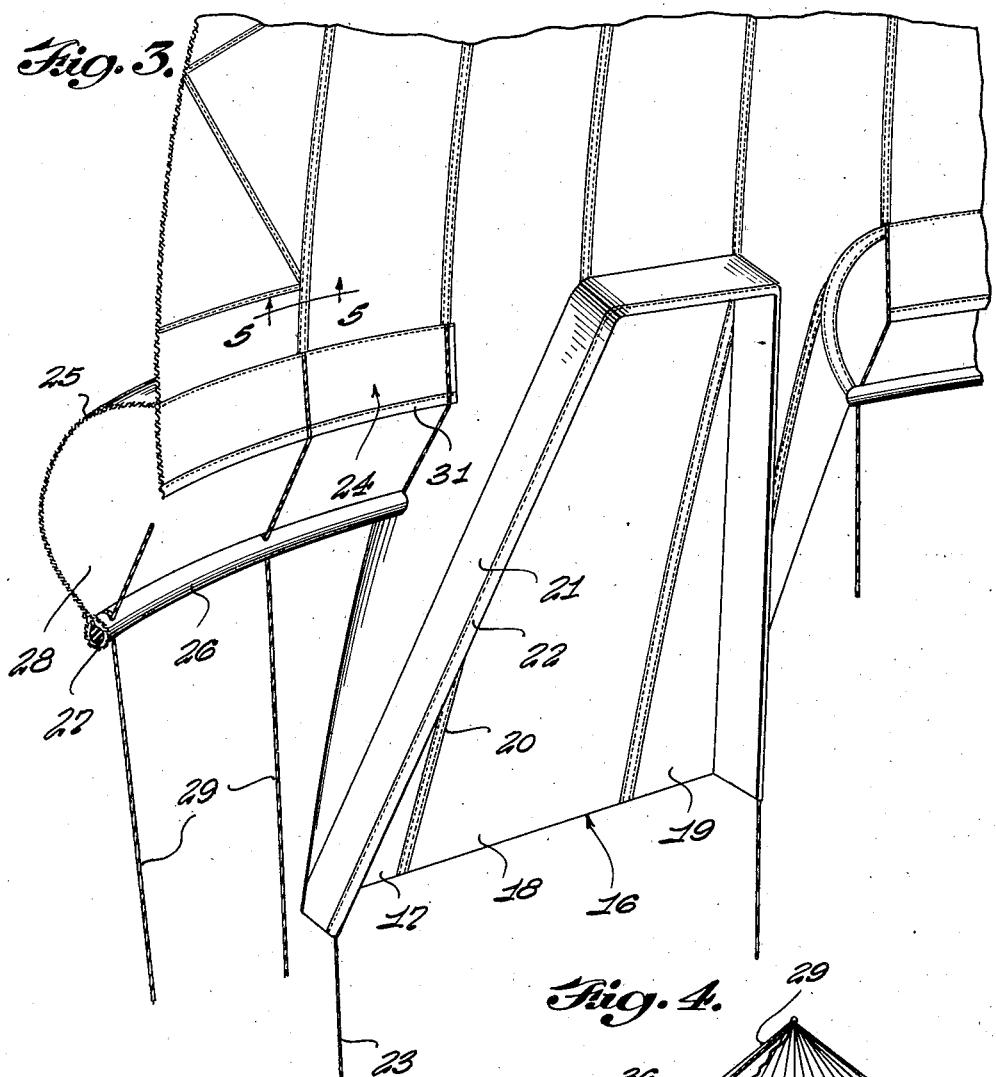
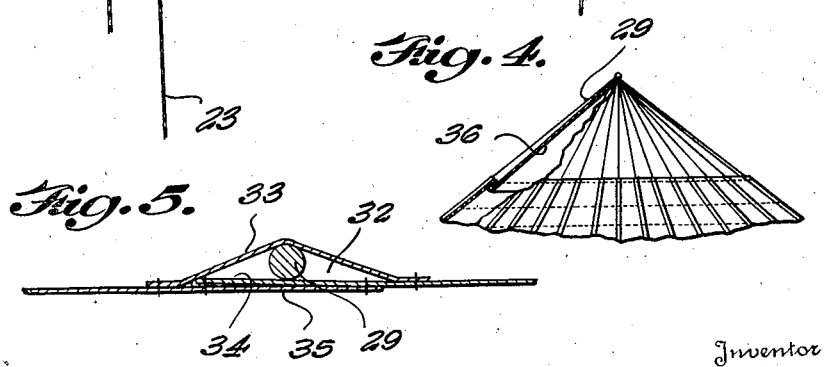
Inventor
George G. Coleman
By Lacey & Lacey,
Attorneys Patented May 11, 1943

2,318,674

UNITED STATES PATENT OFFICE 2,318,674

PARACHUTE

George Gusters Coleman, Greenville, Miss., assignor to Zeppo Parachute Attachment Company, a corporation of Mississippi Application April 9, 1941, Serial No. 387,726

6 Claims. (Cl. 244—142)

This invention relates to an improved parachute.

One object of the invention is to provide a parachute which is made up of a plurality of sections which have their edges cut on the bias at an angle of substantially sixty degrees for forming an extremely strong and durable parachute.

Another object of the invention is to provide a parachute wherein one of the sections employed defines a tail for affording complete control of direction of descent.

Another object of the invention is to provide a device of this character wherein the tail employed is provided with a flap which assists the tail in its steering action.

A still further object of the invention is to provide a parachute having a cooperating flap and skirt construction which extends throughout the circumference of said parachute at its lower end and defines a supplemental air pocket which will serve to give the parachute the action of two separate parachutes.

A still further object of the invention is to provide a device of this nature embodying improved means for tying the load to the body or parachute proper.

And another object of the invention is to provide a parachute which will be simple in construction and highly efficient in use.

Further objects of the invention will become apparent during the course of the following description.

Figure 2:
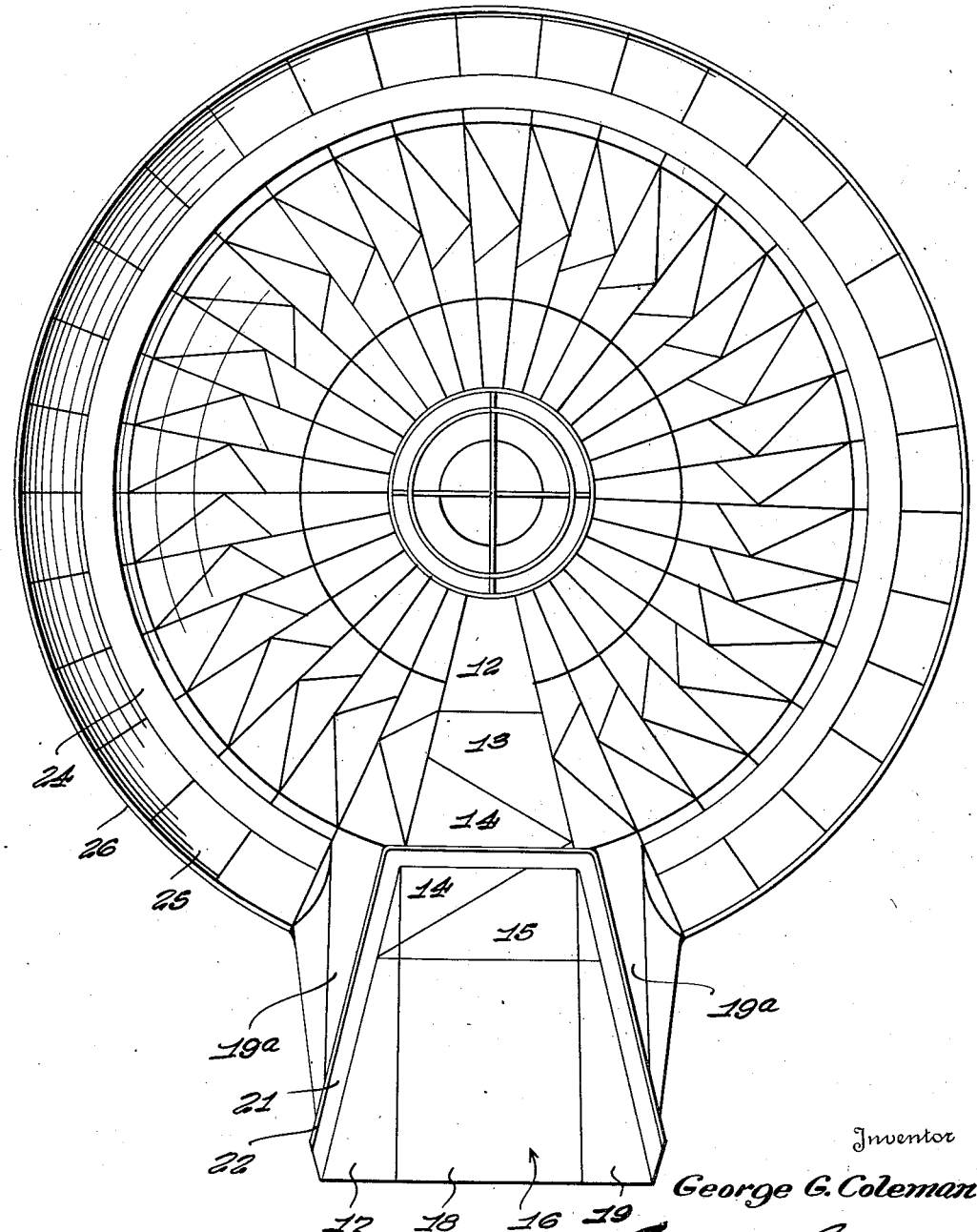

In the drawings:

Figure 1 is a side elevation of my improved parachute as it would appear in actual use, Figure 2 is an enlarged bottom plan view of my parachute with the shroud lines removed, Figure 3 is an enlarged detail perspective view of the invention and showing particularly the cooperating flap and skirt construction and also the improved tail construction, Figure 4 is a detail side elevation showing the cone construction of the parachute, and Figure 5 is an enlarged detail sectional view on the line 5—5 of Figure 3.

In the drawings like numerals of reference will be seen to designate like parts throughout the views.

My improved parachute is, as best seen in Figure 1, of substantially conventional shape when blown to operative position. The parachute is, conventionally, formed of silk, nylon, or other suitable material. My parachute includes a body 10 which is composed of a plurality of panels 11 which extend radially throughout the circumference of said body. The panels each include four sections which, as best seen in Figures 1 and 2, are indicated at 12, 13, 14 and 15. In addition, as best seen in Figures 2 and 3, certain of the panels are extended downwardly to define a tail 16. More specifically, the tail is formed by providing three adjacent panels with extensions 17, 18 and 19. As will be seen, the sections of each panel are cut on the bias at an angle of approximately sixty degrees. However, the extensions 17, 18 and 19 have their adjacent edges connected by straight seams 20. The extensions 17 and 19 define gores 19$^a$ for connecting the extension 18 with the panels of the body which are located adjacent the tail. Positioned on the inner surface of the tail and extending throughout the length of the extensions 17, 18 and 19 is a substantially inverted U-shaped flap 21 which includes a hem 22, said hem receiving a shroud line 23 therethrough. The function of the tail 16 will be set forth in more detail hereinafter.

Extending throughout the major portion of the interior circumference of the body 10 of my improved parachute is a flap 24, said flap having its opposite ends terminating adjacent the extensions 17 and 19 of the tail 16. The flap 24 is connected with the body of the parachute at a point near the lower end edge thereof and cooperates with said lower end edge for defining a skirt 25. The skirt 25 terminates in a hem 26 in which is carried an expanding ring 27. The expanding ring is described and claimed in a copending application and, therefore, will not need further description in this specification. As best seen in Figure 3, the flap 24 and the skirt 25 co-operate to define a pocket 28, the purpose for which will be set forth in more detail hereinafter.

In order to connect the flap 24 and the hem 26 of the skirt 25 and the body of the parachute with a parachute harness and pack assembly, I provide shroud lines 29. Said shroud lines are each connected with the flap, skirt and body of the parachute in an identical manner so that a description of the manner of tying in one of said shroud lines will suffice for all. The typical shroud line 29 extends from the harness and pack assembly, which is indicated in general at 30, upwardly to the hem 26 and through the expanding ring 27 in said hem to the lower edge of the flap 24, which flap is provided with a reinforcing hem 31. The line, further, extends upwardly along the inner surface of the flap to the body of the parachute and upwardly through elongated pockets or sleeves 32 which are defined by sewing or otherwise securing reinforcing strips 33 to the panels 11 along the free outside margins of the sections 12, 13, 14 and 15 thereof, said margins overlapping, as shown at 34 and 35.

The upper end of the parachute is cut away to form a circular top vent in which is mounted a cone 36 which is formed of the same material as the body and which completely closes the vent. As will be observed, the shroud lines extend exteriorly of the cone and cross at the extreme upper end thereof.

It is now desired to describe the operation of my improved parachute. After the conventional rip cord has been pulled, the expanding ring 27 will cause the parachute to be expanded toward operative position. As soon as the wind enters the body of the parachute, said parachute will, of course, be blown to full operative position, as shown in Figure 1. In this position, the shroud lines will assume the position shown in detail in Figure 3. That is to say, air entering the pocket 28 will expand the skirt 25 so that said skirt and the flap 24 will assume the positions shown in Figure 3. The skirt and flap will thus cooperate to define additional lifting means for the parachute. As a matter of fact, the flap and cooperating skirt give the parachute somewhat the same effect as that which would be obtained from the use of two separate parachutes. With further reference to the shroud lines 29, it is desired to call attention to the fact that they tie in with the load in a highly efficient manner. That is to say, the shroud lines are tied to the parachute body 10 at points a substantial distance from the hem of the skirt and also are tied to said hem 26 at the bottom of the skirt. This particular construction assures that the full effect of the air pocket 28 will be obtained.

It is desired to call particular attention to the fact that, inasmuch as the sections 12, 13, 14 and 15 of the panels have edges cut on the bias at an angle of substantially sixty degrees, stress will be distributed evenly throughout the panels.

The tail 16 will provide effective means for controlling the direction of descent of the parachute after the same has been placed in operation. The flap 21 of the tail 16 will tend to confine air flow entering the tail within said tail so that the full effect of the tail may be had. The shroud lines 23 of the tail are manipulated by the aviator for shifting the tail and thus controlling the direction of descent.

It is believed that the construction and operation of my improved parachute will be understood from the foregoing description. Accordingly, further description is thought to be unnecessary.

Having thus described the invention, what is claimed as new is:

1. A parachute including a body, a tail carried by the body and having a flap, shroud lines connecting the body with a harness and pack assembly, and a shroud line extending from the flap for manipulation by an aviator for steering the parachute during descent thereof.

2. A parachute including a body, a flap carried by the body and cooperating therewith to define a skirt, and shroud lines connecting the body, flap and skirt with a parachute harness and pack assembly, said skirt and flap defining an air pocket cooperating with the air pocket defined by the body of the parachute for providing added sustaining effect for the parachute.

3. A parachute including a body, a flap connected with the body near the lower end thereof and defining a skirt for said body, said skirt having a hem, shroud lines having portions connected with the hem and portions connected with the body at the upper end of the flap, said shroud lines extending upwardly along the wall of the body and crossing at the upper end thereof, means on the body confining portions of the shroud lines on the body, said skirt and flap cooperating with the shroud lines for defining an air pocket for implementing the supporting effect of the parachute.

4. A parachute including a body comprising a plurality of panels, each of said panels comprising a plurality of sections cut on the bias and sewed together, extensions connected with the lowermost section of adjacent panels and defining a tail, a flap on the tail, gores connecting the extensions with the adjacent panels, shroud lines connecting the parachute body with a harness and pack assembly, and a shroud line on the flap and being adapted for manipulation by an aviator for guiding the parachute during descent thereof.

5. A parachute including a body comprising a plurality of connected panels, each of said panels including a plurality of sections cut on the bias and connected with each other and with the sections of adjacent panels, and extensions connected with corresponding lowermost sections of adjacent panels and defining a tail, gores connecting the outermost extensions with the lowermost sections of panels adjacent the panels carrying the extensions defining the tail, a flap carried by the tail at its inner surface, shroud lines connecting the body with a harness and pack assembly and having portions extending along the body in overlying relation to the margins of the sections, means limiting the shroud lines against displacement from the body, and shroud lines connected with the flap and engageable for manipulating the tail for steering the parachute during descent thereof.

6. A parachute including a body comprising a plurality of connected panels, each of said panels including a plurality of sections cut on the bias and connected with each other, extensions connected with the lowermost sections of more than two adjacent panels and defining a tail, shroud lines connecting the parachute with a parachute pack and harness assembly, a substantially inverted U-shaped flap connected with the tail and extending along the seams defining the boundaries of said tail, and shroud lines connected with said flap and being engageable for manipulating the tail whereby the direction of descent of the parachute may be controlled.

GEORGE GUSTERS COLEMAN.